Nov. 24, 1959 R. L. TERRY 2,914,683

ANTI-RINGING LIMITER

Filed Aug. 6, 1956 2 Sheets-Sheet 1

INVENTOR:
Robert L. Terry

By Seymour M. Rosenberg
Attorney

Nov. 24, 1959

R. L. TERRY 2,914,683

ANTI-RINGING LIMITER

Filed Aug. 6, 1956

2 Sheets-Sheet 2

INVENTOR:
Robert L. Terry

By Seymour M. Rosenberg
Attorney

United States Patent Office 2,914,683

Patented Nov. 24, 1959

2,914,683

ANTI-RINGING LIMITER

Robert L. Terry, Los Angeles, Calif., assignor to Litton Industries of California, Beverly Hills, Calif.

Application August 6, 1956, Serial No. 602,396

8 Claims. (Cl. 307—88.5)

This invention relates to pulse limiting and damping circuits and more particularly to an anti-ringing limiter for clamping at a predetermined value the amplitude of a voltage pulse obtained across an inductor circuit in response to a current pulse passed therethrough and for damping the inductor circuit to eliminate undesirable subsequent ringing voltage pulses.

It is known that whenever a single current pulse is forced through an inductor, there results a first polarity voltage pulse in response to the rise and a second opposite polarity voltage pulse in response to the fall of the current pulse. Due to the distributed and stray capacitance, winding resistance, and core losses associated with any inductor, the resulting LCR circuit will ring as evidenced by the generation of succeeding alternate polarity voltages pulses of diminishing amplitude which continue until the energy introduced by the current pulse is dissipated by the resistance of the circuit.

In many applications of inductor circuits in electronic equipment, such as blocking oscillators and transformer coupled amplifiers, it is desirable to damp the inductor circuits to substantially eliminate undesirable ringing pulses which tend to develop across the inductors in response to each current pulse passing therethrough. In such application, it is frequently also desirable to limit the amplitude of the desired pulse, hereinafter sometimes referred to as the primary pulse, developed across the inductor by each current pulse to a predetermined fixed value by a suitable clamping circuit.

Since the first and largest amplitude ringing pulse occurring across an inductor is opposite in polarity to the primary pulse, an inductor circuit may be appropriately damped by shunting the inductor by a resistor of proper magnitude and a unidirectional current device or conventional diode connected in series. By properly poling the diode, it will be back-biased by the primary pulses and forward-biased by the first ringing pulse following each primary pulse. In this manner, the resistor is isolated from the inductor during the development of each primary pulse whereas the ringing pulse following each primary pulse produces a current flow through the resistor thus substantially dissipating the energy remaining in the inductor.

The above described damping technique, well-known in the art, is quite satisfactory for eliminating undesirable ringing pulses from developing across an inductor circuit. Additional circuitry, however, is required to limit the amplitude of the desired primary pulses to a desired predetermined value. In the prior art, diode clamping circuits are generally utilized to limit the amplitude of the desired output pulses. A diode clamping circuit, in its simplest form, requires a low impedance potential source and a diode. The low impedance potential source is selected to develop a constant D.C. potential, referred to as a clamping voltage, equal to the desired amplitude limit of the primary output pulses. The D.C. potential source is coupled to the inductor circuit by the diode in a manner whereby the diode is back-biased so long as the amplitude of the desired output pulses is less than the clamping voltage, and is forward-biased whenever the amplitude of an output pulse is greater than the clamping voltage. Assuming that output pulses having a possible amplitude greater than the clamping voltage are developed across the inductor, the diode clamping circuit limits the output pulses to the amplitude of the clamping voltage since any tendency of a pulse to exceed this value causes a heavy current flow through the forward-biased diode and low impedance D.C. potential source.

According to the prior art, therefore, in order to obtain a single desired output pulse of a predetermined fixed amplitude from an inductor circuit in response to a single current pulse passing through the inductor of the circuit and at the same time avoid the development of undesirable ringing pulses, two separate circuits are necessary. First, some form of damping circuit, such as the series diode-resistor circuit above described, is necessary to critically dampen the inductor circuit. Second, a separate clamping circuit including a second diode and a low impedance D.C. potential source is needed to clamp the amplitude of the output pulse at the predetermined desired level.

By far the most undesirable feature of the prior art damping and clamping circuitry above described is the necessity for developing clamping voltages from a low impedance source. In order to accurately clamp the desired output pulses at a predetermined amplitude, two rigid requirements are imposed on the clamping voltage source. First, in order to sharply cut-off the amplitude of the pulses at the predetermined level, i.e. provided flat-topped pulses, the clamping voltage source must provide a low impedance current path for current conducted through the clamping diode when the latter is forward-biased. Secondly, the clamping voltage source must be very accurately regulated to provide the exact desired clamping voltage at all times irrespective of changing load. It should be further understood that if (as is usually the case) the inductor is referenced to some voltage other than ground, it is necessary to regulate this reference voltage as well as the clamping voltage for any relative change between the clamping voltage and the reference voltage will cause variations in pulse amplitude even though the absolute value of the clamping voltage remains unchanged.

In relatively complex electronic equipment, such as radar and digital computing apparatus, wherein a multitude of inductively coupled pulse circuits may be found, the development of suitable clamping voltages for clamping voltage pulses generated across the inductors within the equipment, may require considerable circuitry. Because of the required low impedance and high regulation of the clamping voltage source, the clamping voltage source may represent a substantial portion of an electronic apparatus. The problem is especially complex where a variety of different valued clamping voltages are required to clamp the amplitude of voltage signals developed across a number of inductors within a single machine at correspondingly different amplitude levels.

Accordingly, it is an object of the present invention to provide an anti-ringing limiter, which does not require a clamping voltage potential source, the limiter clamping at a predetermined level the amplitude of a voltage pulse developed across an inductor circuit in response to a current pulse forced therethrough, and damping the inductor circuit to prevent undesired ringing pulses from developing.

It is also an object of the present invention to provide an anti-ringing limiter in accordance with the present invention comprising a resistor and a single Zener diode.

A further object of the present invention is to provide a modified anti-ringing limiter circuit in accordance with the invention comprising a resistor, a Zener diode, and a conventional unidirectional current device.

In accordance with the basic concepts of the present invention, an anti-ringing limiter for limiting the amplitude of a desired primary voltage pulse obtained across an inductor in response to a current pulse passing therethrough, and for damping the inductor to eliminate ringing pulses tending to develop across the inductor in response to the same current pulse is obtained without the necessity for generating a separate clamping voltage by shunting the inductor with a resistor and a Zener diode connected in series. A Zener diode, as is well-known in the art, has the characteristic of becoming strongly conductive at a fixed, predetermined back-bias breakdown voltage referred to as the Zener voltage of the diode. Whenever the back-bias voltage across the diode tends to increase beyond the Zener voltage, a back-current is passed through the diode which tends to prevent further increase of the back voltage.

The series circuit comprised of the resistor and Zener diode is connected across an inductor in a manner to cause the Zener diode to be back-biased by each desired primary voltage pulse developed across the inductor and forward-biased by the subsequent opposite polarity ringing pulse following each primary pulse. Thus the inductor may be appropriately damped (preferably critically damped) by passing through the resistor which has a predetermined resistance magnitude chosen so as to furnish the desired damping, thereby dissipating energy stored in the inductor in response to a ringing pulse, yet isolating the resistor from the inductor as each desired primary pulse is developed across the inductor. When the amplitude of a desired primary pulse exceeds the Zener voltage of the diode, on the other hand, a back-current flows through the diode and thence through the resistor thereby substantially limiting the amplitude of each desired voltage pulse to the Zener voltage of the diode. By the proper selection of a Zener diode, any desired Zener voltage and hence any desired amplitude of the output pulses may be obtained.

To further improve the amplitude limiting action of the anti-ringing limiter of the present invention, it may be desirable to shunt the Zener diode back-current around the resistor. To accomplish this it is merely necessary to shunt the resistor by a conventional unidirectional current device, i.e. a conventional diode which is forward-biased by the desired primary voltage pulses. Back-current passing through the Zener diode is thereby shunted around the resistor through the forward-biased conventional diode.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
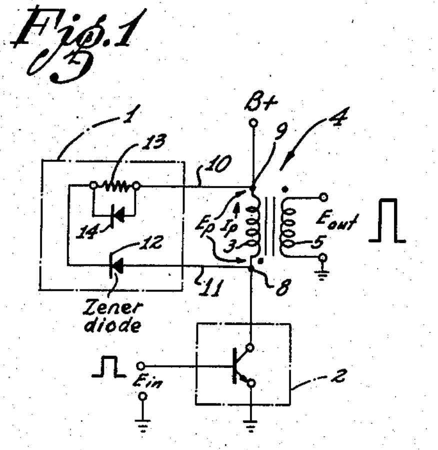
Fig. 1 is a schematic circuit diagram of an embodiment of the anti-ringing limiter of the present invention illustrated in conjunction with an inductor-loaded amplifier stage for limiting negative pulses produced in the inductor.

Referring to Fig. 1, there is schematically presented an embodiment of an anti-ringing limiter in accordance with the present invention, the limiter being shown as being adapted for operation in conjunction with a transformer coupled amplifier stage including an amplifier element 2, supplied with power from a B+ supply, not shown, through a primary winding 3 of a transformer 4. Amplifier 2 is responsive to application of a positive input pulse for developing across a secondary 5 of transformer 4, a positive outpu pulse representing an amplified replica of the input pulse, the amplitude of the output pulse being limited to a predetermined maximum value. Although amplifier element 2 may be any type of amplifier element such as a vacuum tube, diode amplifier, etc., as shown in Fig. 1 amplifier element 2 is illustrated as an NPN type transistor having its collector connected to a lower terminal 8 of primary winding 3 and its emitter connected to a source of ground potential, the positive input pulse being applied to the base region of the transistor. Since upper terminal 9 of primary winding 3 is connected, as illustrated, to the B+ supply, a positive input pulse causes a corresponding positive current pulse to be forced through primary winding 3.

Consider first the case where the anti-ringing limiter circuit 1 is disconnected from primary winding 3. Since the voltage signals appearing across winding 3, in response to a single current pulse passing therethrough, are a function of $$-L\frac{di}{dt}$$

a negative voltage pulse will be developed across the winding in response to the leading or rising edge of the current pulse and a subsequent positive voltage pulse will be developed across the winding in response to the falling or trailing edge of the current pulse. Further, due to the distributed capacitance of winding 3 and additional unavoidable stray capacitance existing between the remainder of the amplifier stage and ground, the resulting LC circuit will ring due to oscillation of energy between the inductance and capacitance of the circuit. As a consequence, alternate positive and negative voltage pulses are developed across winding 3 until the energy introduced into the winding by the single current pulse is dissipated in the resistance of the circuit.

It is desired, however, to produce but a single positive output pulse having a predetermined amplitude, across secondary winding 5 of the transformer in response to positive input pulse applied to amplifier 2. Accordingly, it is necessary both to limit the amplitude of the negative pulse across winding 3 to a predetermined value and also to damp the winding for the subsequent positive ringing pulse to thereby substantially eliminate ringing signals in the winding.

The above objectives are accomplished by connecting output leads 11 and 10 of the anti-ringing limiter 1 of the present invention to terminals 8 and 9, respectively, of winding 3 as illustrated. Anti-ringing limiter 1 includes a Zener diode 12 having its anode connected by a conductor 11 to terminal 8 of winding 3 and having its cathode connected to one end of a damping resistor 13 whose other end is connected by a conductor 10 to the other terminal 9 of winding 3. It is clear that a series-diode-resistor circuit is thereby established across winding 3. As shown in Fig. 1, Zener diode 12 is poled so that it is back-biased by the desired negative primary pulse appearing across winding 3 and forward-biased by the succeeding positive ringing pulse.

When a positive current pulse is forced through winding 3 in response to application of a positive input voltage pulse, the negative (primary) voltage pulse, developed across winding 3 in response to the rise of the current pulse, back-biases diode 12. As a result, resistor 13 is isolated from winding 3 at this time. The succeeding positive ringing pulse forward-biases diode 12 and thus permits current flow through the diode and thence through resistor 13. As a result, by the proper choice of resistance value for resistor 13, the energy introduced in winding 3 by the current pulse may be substantially dissipated in the resistor so that undesired ringing pulses may be damped to any extent desired.

Consider now the operation of anti-ringing limiter 1 when a desired negative voltage pulse appearing across winding 3 exceeds in amplitude the Zener voltage of Zener diode 12. When this occurs, Zener diode 12 breaks down and permits a back-current to flow through diode 12 and thence through resistor 13. Amplifier 2 now operates into a much lower impedance than was the case when the transformer 4 and any external impedance connected thereto represented the only load on the amplifier stage. As a consequence, any further increase in current supplied by amplifier 2 produces only very slight corresponding increase in voltage developed across winding 3, the increase in current being shunted as a back-current through Zener diode 12 and thence through resistor 13. As a result, the amplitude of the negative voltage pulse is substantially maintained at the value of the Zener voltage.

It may happen that the value of resistor 13 required to appropriately damp the inductive circuit of primary winding 3 may be too large to permit sufficient back-current flow through Zener diode 12 for sharply limiting the amplitude of the desired negative voltage pulses at the predetermined Zener voltage level. In this case it is desirable to shunt resistor 13 by a conventional diode 14 as shown in Fig. 1, diode 14 having a polarity as indicated so that it is forward-biased by the desired negative voltage pulses to provide a low impedance path around resistor 13 for the back-current of Zener diode 12.

Figure 2:
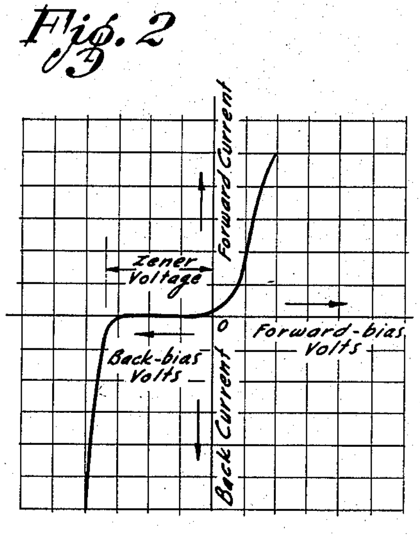
Fig. 2 is a graph illustrating the voltage current characteristics of a typical Zener diode.

As an aid to a clear understanding of the operation of Zener diode 12 of Fig. 1, reference is briefly made to Fig. 2 wherein there is presented a graph of the voltage-current characteristic of a typical Zener diode. In the graph, forward-bias voltages are scaled along the abscissa of the graph to the right and back-bias voltages to the left of the ordinate. Corresponding forward and back currents are scaled on the ordinate of the graph above and below the abscissa, respectively. The voltage-current characteristic of a typical Zener diode is represented in the graph by a heavy line so labeled. The Zener or back-bias breakdown voltage of the diode is indicated by an arrow along a portion of the back-bias voltage scale of the abscissa.

Figure 3:
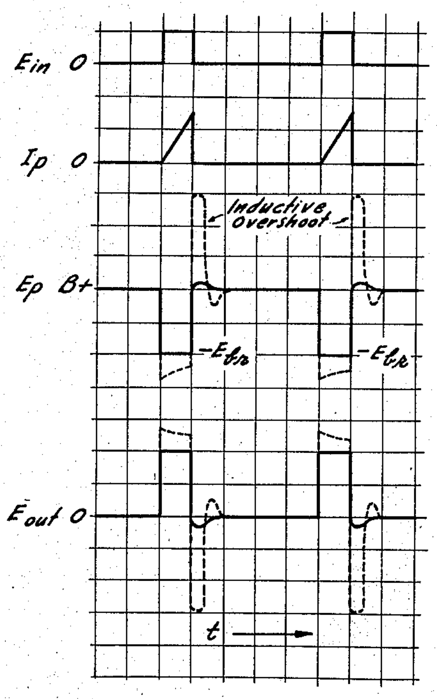
Fig. 3 is a waveform chart illustrating the nature of the pulse signals appearing at various points in the circuit of Fig. 1.

The nature of the pulse signals appearing at various points in the circuit of Fig. 1 in response to two successive positive input pulses designated $E_{in}$, are presented in the waveform chart of Fig. 3 wherein the actual signals appearing at the corresponding points of the circuit are illustrated by solid lines and the signals which would appear at these points were the anti-ringing limiter 1 removed from the remainder of the circuit are indicated by dotted lines. The reference voltage of each waveform is indicated just to the right of the symbol identifying the waveform.

Considering briefly the waveforms of Fig. 3, each positive input pulse $E_{in}$ causes a corresponding positive current pulse to be forced through primary winding 3. For purposes of illustration, only the magnetization current pulses $I_p$ are shown. It should be understood however, that the resultant current pulse developed by amplifier 2 in response to each input voltage $E_{in}$ includes a magnetization and a transformer load current combined to produce a single current pulse through winding 3. Additional current supplied by amplifier 2 will be shunted through diode 12 and resistor 13.

Assume first that anti-ringing limiter 1 is disconnected from the remainder of the circuitry of Fig. 1. The leading edge of each current pulse $I_p$ will cause a negative pulse across winding 3, as indicated by the dotted lines of waveform $E_p$. Following each negative pulse, a positive ringing pulse, indicated by dotted lines, is developed coincident with the trailing edge of the corresponding current pulse. The effect upon the waveform $E_p$ by the addition of anti-ringing limiter 1 to the circuit of Fig. 1 is indicated by the solid lines wherein the amplitude of each of the desired negative pulses is substantially limited to the Zener voltage $E_{br}$ of Zener diode 12, and the positive ringing pulses are substantially eliminated.

The output voltage pulses $E_{out}$ appearing across secondary winding 5, of the circuit of Fig. 1 are indicated by solid lines in the waveform chart of Fig. 3. The output pulses $E_{out}$ which would appear in the absence of anti-ringing limiter are represented in the waveform chart, as before, by dotted lines.

Figure 4:
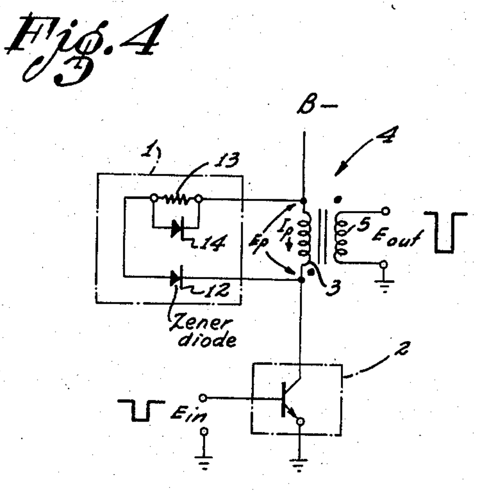
Fig. 4 is a schematic circuit diagram of an embodiment of the anti-ringing limiter circuit of the present invention illustrated in conjunction with an inductor-loaded amplifier stage for limiting positive output pulses produced in the inductor.

Referring to Fig. 4, there is schematically illustrated a second embodiment 20, indicated by broken lines, of the anti-ringing limiter of the present invention adapted for operation in conjunction with a transformer coupled amplifier stage for amplifying a negative input pulse $E_{in}$ impressed on the input of amplifying element 2 supplied with power from a B− supply, not shown, through the primary of transformer 3 to produce a corresponding negative output pulse $E_{out}$ across the secondary of the transformer. Amplifying element 2, which may be any form of amplifier unit, is represented herein as a PNP type transistor connected as illustrated to induce a negative current pulse through the primary winding of transformer 3 in response to the negative voltage pulse $E_{in}$ applied to the base region thereof.

Anti-ringing limiter 1 is connected across the primary winding of transformer 3 and is operative to critically damp the inductive circuit represented by transformer 3 and to limit the amplitude of the primary or positive voltage pulse developed across the primary winding of the transformer in response to the leading edge of each current pulse forced therethrough.

Referring now to Fig. 4 there is shown an embodiment of anti-ringing limiter 1 which is adapted for limiting primary positive pulses and damping subsequent negative ringing pulses produced in winding 3 by amplifier element 2 in response to the application of negative pulse ($E_{in}$) to the input of amplifier element 2. Since as indicated in Fig. 4 the desired primary voltage pulse and the undesired ringing pulse will be opposite in polarity to the corresponding primary and ringing pulses indicated in connection with Fig. 1, it is clear that in the embodiment of anti-ringing limiter shown in Fig. 1 the Zener diode 12 and diode 14 will be oppositely poled so that the positive pulse is clamped at the Zener voltage level and the succeeding negative ringing pulse is strongly damped.

Figure 5:
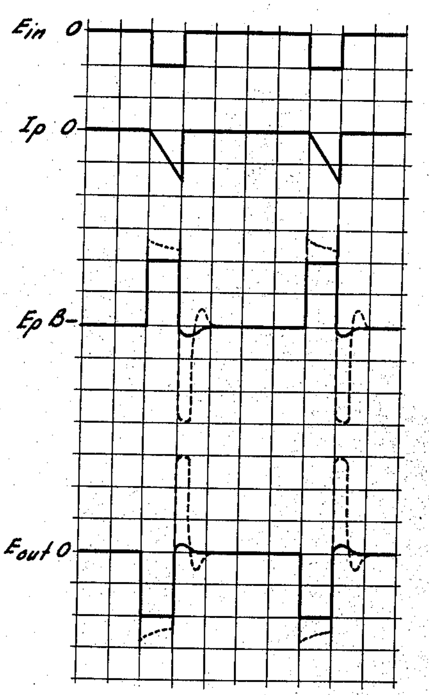
Fig. 5 is a waveform chart illustrating the nature of the pulse signals appearing at various points in the circuitry illustrated in Fig. 4.

The waveforms appearing at various identified points in the circuit of Fig. 4 in response to two successive negative input pulses $E_{in}$ are illustrated in the waveform chart of Fig. 5. In Fig. 5 the actual signals or pulse waveforms appearing at the identified points are, as before, indicated by solid lines, whereas the waveforms which would appear at the identical points of the circuit, were anti-ringing limiter 1 removed, are indicated by dotted lines. Since the waveforms of Fig. 5 are symmetrical to the waveforms of Fig. 3, further explanation of the waveform chart of Fig. 5 is not required.

What is claimed as new is:

1. In a pulse circuit including an inductor and means for passing through the inductor a current pulse whose rise and fall tends to develop a first polarity and a succeeding second opposite polarity voltage pulse, respectively, across the inductor, an anti-ringing limiter coupled to the inductor for limiting the amplitude of the first polarity voltage pulse to a predetermined value and for damping the development of the second polarity voltage pulse, said anti-ringing limiter comprising: a resistor having a first and a second terminal, said first terminal being coupled to one extremity of the inductor; and a Zener diode operable for passing current strongly in its back direction whenever it is back-biased by a voltage equal to said predetermined level, said Zener diode being coupled between the second terminal of said resistor and the other extremity of the inductor for isolating said resistor from the inductor when the first polarity voltage pulse is less than the predetermined level and for coupling said resistor to the inductor when the second polarity voltage is developed and when the first polarity voltage pulse exceeds said predetermined level.

2. An anti-ringing limiter circuit coupled to an inductor for limiting to a predetermined level the amplitude of a first polarity voltage pulse developed across the inductor in response to a current pulse passing therethrough and for damping the inductor to reduce the development of an opposite polarity ringing pulse across the inductor in response to the same current pulse, said anti-ringing limiter circuit comprising: a damping resistance element having a first and a second terminal, said first terminal being coupled to one extremity of the inductor; and a Zener diode connected between the second terminal of said resistance element and the other extremity of the inductor, said Zener diode being poled so as to be back-biased by the first polarity voltage pulse and forward-biased by the opposite polarity ringing pulse and having a Zener breakdown voltage equal to the predetermined level thereby permitting back-current conduction through said Zener diode when the amplitude of the first polarity voltage pulse exceeds said predetermined level.

3. An anti-ringing limiter coupled to an inductor for clamping at a predetermined amplitude level the first voltage pulse developed across the inductor in response to the rise of a current pulse forced therethrough and for critically damping the inductor to reduce a second opposite polarity ringing pulse developing across the inductor in response to the fall of the current pulse; said limiter comprising: a resistor; coupling means connected between said resistor and the inductor and operative to couple said resistor across the inductor in response to the ringing pulse and operative in response to the first voltage pulse to de-couple said resistor so long as the amplitude of the first voltage pulse is less than the predetermined amplitude level and to couple said resistor across the inductor when the amplitude of said first voltage pulse is greater than said predetermined reference level.

4. The anti-ringing limiter defined in claim 3 wherein said limiter further includes a unidirectional current device shunt connected across said resistor, said unidirectional current device being poled so as to be forward-biased by the first voltage pulse and back-biased by the ringing voltage pulse.

5. The anti-ringing limiter defined in claim 3 wherein said coupling means includes a Zener diode intercoupled between one end of said resistor and an extremity of said inductor and poled so as to be back-biased by the first voltage pulse and forward-biased by the ringing voltage pulse, said Zener diode having a back-bias breakdown voltage equal to said predetermined amplitude level.

6. A damped inductively-coupled amplifier circuit coupled to a potential source and responsive to an applied voltage input pulse for amplifying the input pulse to produce a corresponding amplifier output pulse of a predetermined amplitude level; said amplifier comprising: an inductor having first and second inductor terminals, said first inductor terminal being connected to the potential source; an amplifying element having a pair of input terminals for receiving the applied voltage input pulse and an output terminal connected to the second inductor terminal, said amplifying element being operative in response to the single input voltage pulse for forcing a corresponding current pulse through said inductor to thereby tend to cause a first polarity voltage pulse and a subsequent opposite polarity ringing voltage pulse to be developed across said inductor; and an anti-ringing limiter intercoupled between said first and second inductor terminals, said limiter including a Zener diode and a resistor connected in series across said first and second inductor terminals, said Zener diode being poled so as to be back-biased by said first polarity voltage pulse and forward-biased by said ringing pulse and having a predetermined back-bias breakdown voltage equal to the predetermined amplitude level, whereby said limiter is operative to limit the amplitude of said first polarity voltage pulse to the predetermined amplitude level and to damp said ringing voltage pulse.

7. The damped inductively-coupled amplifier circuit defined in claim 6 wherein said amplifying element is a transistor having its collector connected to the second inductor terminal and wherein said anti-ringing limiter further includes a unidirectional current device connected across said resistor and poled so as to be forward-biased by said first polarity voltage pulse and back-biased by said ringing voltage pulse.

8. The damped inductively-coupled amplifier circuit defined in claim 7 wherein said resistor has a predetermined resistance magnitude such that the ringing voltage pulse is substantially critically damped.

References Cited in the file of this patent

UNITED STATES PATENTS

| | | |
|---|---|---|
| 2,594,336 | Mohr | Apr. 29, 1952 |
| 2,714,702 | Shockley | Aug. 2, 1955 |
| 2,723,346 | Magnuson | Nov. 8, 1955 |
| 2,758,206 | Hamilton | Aug. 7, 1956 |
| 2,776,375 | Keiper | Jan. 1, 1957 |
| 2,809,339 | Guggi | Oct. 8, 1957 |